United States Patent [19]

Dalton

[11] Patent Number: 5,478,539
[45] Date of Patent: Dec. 26, 1995

[54] PROCESS FOR THE RECOVERY OF METALS

[75] Inventor: Raymond F. Dalton, Cheadle Hulme, United Kingdom

[73] Assignee: Zeneca Limited, London, England

[21] Appl. No.: 401,283

[22] Filed: Mar. 9, 1995

Related U.S. Application Data

[63] Continuation of Ser. No. 21,669, Feb. 24, 1993, abandoned, which is a continuation of Ser. No. 845,822, Mar. 6, 1992, Pat. No. 5,213,777, which is a continuation of Ser. No. 585,277, Sep. 14, 1990, abandoned, which is a continuation of Ser. No. 443,052, Nov. 28, 1989, abandoned, which is a continuation of Ser. No. 155,802, Feb. 16, 1988, abandoned.

[30] Foreign Application Priority Data

Jul. 22, 1981 [GB] United Kingdom ............... 8122586
Apr. 1, 1987 [GB] United Kingdom ............... 8707798

[51] Int. Cl.⁶ ............................ B01D 11/00; C01G 31/00; C01G 37/00; C01G 39/00
[52] U.S. Cl. .............................. 423/54; 423/63
[58] Field of Search ...................... 423/54, 63, 139, 423/DIG. 14; 210/682, 684, 688; 548/335

[56] References Cited

U.S. PATENT DOCUMENTS

| | | | |
|---|---|---|---|
| 3,677,978 | 7/1972 | Dowbenko et al. | 548/335 |
| 3,843,667 | 10/1974 | Cuprey | 423/139 |
| 4,039,612 | 8/1977 | Price et al. | 75/101 BE |
| 4,112,044 | 9/1978 | Miyake et al. | 423/7 |
| 4,112,045 | 9/1978 | Seka et al. | 423/7 |
| 4,118,457 | 10/1978 | Seka et al. | 423/7 |
| 4,478,698 | 10/1984 | Wilkomirsky et al. | 423/56 |
| 4,576,815 | 3/1986 | Robinson | 544/335 |
| 4,748,008 | 5/1988 | Takeda et al. | 423/7 |
| 4,822,880 | 4/1989 | Devonald et al. | 549/335 |
| 4,961,856 | 10/1990 | Dalton et al. | 423/24 |

FOREIGN PATENT DOCUMENTS 2203420  10/1988  United Kingdom.

OTHER PUBLICATIONS

Lo et al, Handbook of Solvent Extraction, p. 640, 1983, no month.

*Primary Examiner*—Steven Bos
*Attorney, Agent, or Firm*—Cushman, Darby & Cushman

[57] ABSTRACT

Metal values (especially uranium values) are extracted from aqueous solutions of metal oxyions in the absence of halogen ion using an imidazole of defined formula. Especially preferred extractants are 1-alkyl imidazoles and benzimidazoles having from 7 to 25 carbon atoms in the alkyl group.

5 Claims, 2 Drawing Sheets

PROCESS FOR THE RECOVERY OF METALS

This is a continuation of application Ser. No. 08/021,669, filed on Feb. 24, 1993, now abandoned, which is a continuation of Ser. No. 07/845,822 filed Mar. 6, 1992, now U.S. Pat. No. 5,213,777, which is a continuation of Ser. No. 07/585,277 filed Sep. 14, 1990, now abandoned, which is a continuation of Ser. No. 07/443,052 filed Nov. 28, 1989, now abandoned, which is a continuation of Ser. No. 07/155,802 filed Feb. 16, 1988, now abandoned.

This invention relates to a process for the recovery of metals, and in particular to a process for the recovery of metals capable of forming oxyions in aqueous solution.

The use of solvent extraction techniques for the recovery of metals has been practised for a number of years, and was first applied commercially on a large scale to the extraction of uranium from its ores. Typically the uranium ore is milled to a suitably small particle size and is leached with dilute sulphuric acid to form an aqueous solution containing the uranyl ion, $UO_2^{2+}$, which may exist as complex salts with one or more sulphate ions such as $UO_2(SO_4)_2^{2-}$ or $UO_2(SO_4)_3^{4-}$. It is to this solution that the solvent extraction technique is applied. Commercially, uranium is one of the most significant of the metals capable of forming oxyions in aqueous solution.

A large number of compounds have been proposed as extractants for metals such as uranium, but few have proved to be commercially successful. The most widely used extractant for uranium at the present time is tri-n-octylamine, which typically is used in a solvent extraction plant having up to five extraction stages and up to four strip stages. Each stage requires a separate mixer-settler, and in consequence a large and expensive plant is required.

The present invention seeks to provide an improved extractant for the recovery of metals capable of forming oxyions in solution, and in particular a reagent capable of operating with a reduced number of extraction and/or strip stages.

In United Kingdom Patent Specification No. 1504894 there is described a process for the extraction of metal values from aqueous solutions of metal salts using an extractant in the presence of halogen or psuedo halogen anions. The halogen or pseudohalogen anion is essential to the extraction process and takes part in the formation of a neutral complex such as $[L_2MX_2]$ where L is the extractant, M is a divalent metal cation and X is a halogen or pseudohalogen ion. The process is particularly applicable to solutions of salts of metals such as copper, cobalt and zinc. Included amongst the extractants disclosed are certain imidazoles.

The solvent extraction processes described in United Kingdom Patent Specification No. 1504894 are radically different from solvent extraction processes used to recovery metals such as uranium. Thus uranium is present in the leach solution in the form of the uranyl oxyion, not as a uranium salt, and furthermore the extraction takes place by the ion exchange of charged ionic species, and not by the formation of an uncharged complex species. Uranium cannot be extracted from a solution containing a significant concentration of halide or pseudohalogen ions using nitrogen-based extractants.

Figure 1:
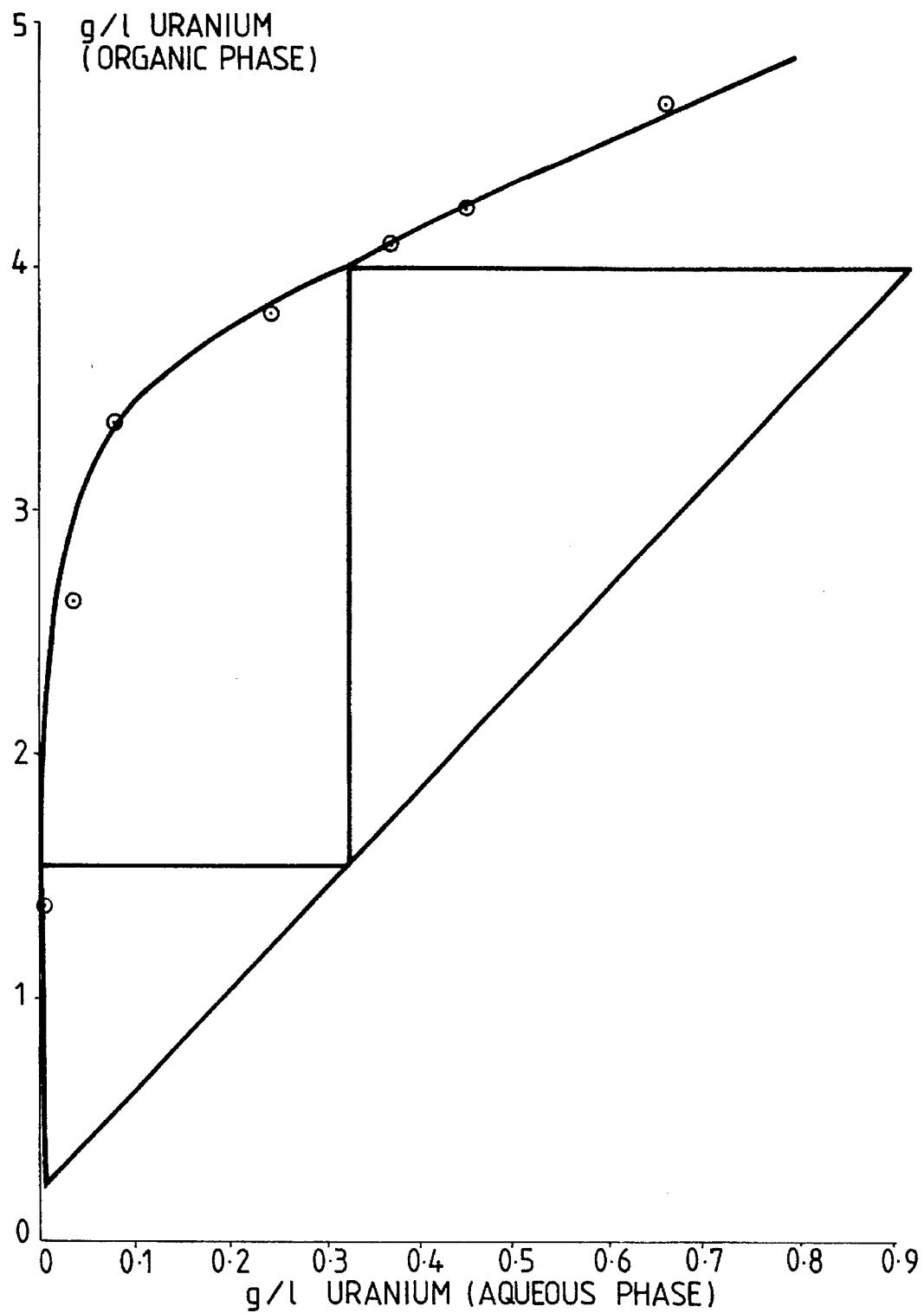
FIG. 1 is an extraction isotherm.

According to the present invention there is provided a process for the extraction of metal values from an aqueous solution of a metal oxyion in the absence of halogen or pseudohalogen anions which comprises contacting the aqueous solution with a solution in a water-immiscible organic solvent of an imidazole of formula (I)

where $R_1$ is an aliphatic, cycloaliphatic, aryl or aralkyl group, $R_2$ is a hydrogen atom or a methyl ethyl or vinyl group, and $R_3$ and $R_4$, which may be the same or different, are each a hydrogen, a hydrocarbon group attached directly or through an oxygen atom to the rest of the molecule, or both $R_3$ and $R_4$ together with the two carbon atoms joining them form an optionally substituted ring, said compound containing a total of at least five alkyl, alkenyl or cycloalkyl carbon atoms in the groups $R_1$, $R_2$, $R_3$ and $R_4$ and separating the aqueous phase from the organic phase which contains in solution a complex of the metal oxyion and the imidazole.

According to a further aspect of the present invention there is provided a process for the extraction of metal values from an aqueous solution of a metal oxyion in the absence of halogen or pseudohalogen anions which comprises contacting the aqueous solution with a solution in a water-immiscible organic solvent of an imidazole of formula (II) or a benzimidazole of formula (III)

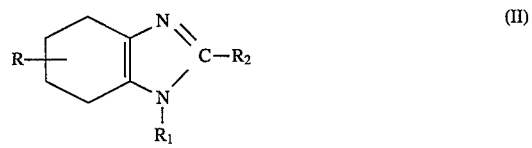

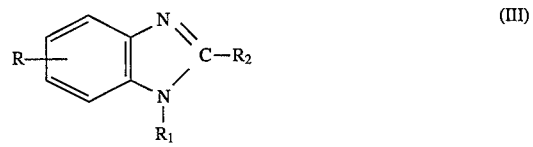

where $R_1$ is an aliphatic, cycloaliphatic, aryl or aralkyl group, $R_2$ is a hydrogen atom or a methyl or ethyl group, and R is hydrogen or an alkyl group or an alkoxy group or a nitro, chloro, carboxyalkyl or acyl group, the total number of carbon atoms in the groups $R_1$, $R_2$ and R being at least five, and separating the aqueous phase from the organic phase which contains in solution a complex of the metal oxyion and the imidazole or benzimidazole.

For the extraction of uranium R is preferably hydrogen or an alkyl group or alkoxy group.

It is preferred that the groups $R_1$, $R_2$ and R contain a total of at least 7, and especially at least 9 carbon atoms, since such groups increase the solubility of the imidazole or benzimidazole and the metal complex formed therefrom in the water-immiscible solvent. It is especially preferred that the more bulky substituents be located in the 1-position ($R_1$). Thus $R_2$ is preferably hydrogen, and R is preferably hydrogen or a lower alkyl or alkoxy group having from 1 to 4 carbon atoms. It is preferred to avoid bulky substituents in the 4-position, and the substituent R is preferably in the 5-position and/or in the 6-position, or a mixture of two compounds is used in which R is in the 5-position and 6-position respectively. It may be convenient to have as group R a methyl or methoxy group in the 5-position, since this may facilitate preparation of the compound. It is not usually advantageous to have more than a total of 25 carbon atoms in the groups $R_1$, $R_2$ and R.

$R_1$ is preferably an alkyl group having from 7 to 25 carbon atoms. Especially preferred are branched chain alkyl groups. Isomeric mixtures of branched chain alkyl groups are especially suitable in achieving good solubility for the extractant and its complex with the metal. Examples of suitable groups $R_1$ are branched chain nonyl groups, branched chain isodecyl groups in which the source of the decyl groups is decanol obtained by carbonylation of propylene trimer; branched chain dodecyl groups and branched chain tridecyl and hexadecyl groups.

Especially useful results have been obtained when $R_1$ is a hexadecyl group, preferably a branched chain hexadecyl group having the structure

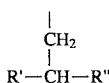

where R' and R" are alkyl groups containing approximately equal numbers of carbon atoms, for example the 2-hexyldecyl group:

(IV)

It is found that imidazoles and benzimidazoles having this substituent in the 1-position show good organic phase solubility of the extractant and its copper complex, low aqueous phase solubility, and good phase disengagement. The $C_8H_{17}$ and $C_6H_{13}$ groups of the 2-hexyl-decyl group (IV) may themselves be branched, and may consist of an isomeric mixture of alkyl groups. Surprisingly, however it is found that excellent results are also obtained when the $C_8H_{17}$ and $C_6H_{13}$ groups of the branched 2-hexyl-decyl group (IV) are each straight chain groups, so that the 2-hexyl-decyl group is a single species rather than an isomeric mixture.

The imidazoles and benzimidazoles may be prepared by any of the conventional and well-known general methods applicable to compounds of formula (I), (II) and (III).

The process of the present invention comprises the steps of (1) contacting the aqueous solution of the metal oxyanion with a solution in a water-immiscible organic solvent of the imidazole or benzimidazole and (2) separating the aqueous phase from the organic phase which contains in solution a complex of the metal oxyanion and the imidazole or benzimidazole. Preferably the metal-containing organic phase is further treated by the steps of (3) contacting the organic phase from step (2) with an aqueous solution of a stripping agent and (4) separating the organic phase from the aqueous phase containing the metal in the form of a complex with the stripping agent.

The stripping agent is a species which in the aqueous phase forms a complex with the metal oxyion which is more stable than the organic phase complex of the metal oxyanion and the imidazole or benzimidazole. Examples of suitable stripping agents are ammonium sulphate solution, sodium chloride and sodium carbonate. Nitric acid may be used but is generally less favoured as it tends to have too great an affinity for the imidazole or benzimidazole which must then be stripped of nitric acid before the (benz)-imidazole can be recycled to extraction.

The stripped aqueous phase solution of the metal from step (4) may be treated in any suitable manner to recover the metal in the desired final form. For example the aqueous phase stripped uranium solution may be treated with aqueous ammonia to precipitate ammonium diuranate which may be subsequently heated to convert it to uranium oxide or "yellow cake".

The process of the present invention may use conventional solvent extraction plant and techniques. For example the contacting of the aqueous solution of the metal oxyion with the organic phase containing the imidazole or benzimidazole and the subsequent separation of the phases [steps (1) and (2)—the extraction stage] may take place in conventional mixer-settlers as may the contacting of the metal-containing organic phase with the aqueous stripping solution, and the subsequent separation of the phases [steps (3) and (4)—the stripping stage]. In general the extraction and stripping will both take place in a plurality of individual extraction and strip stages, each with its own mixer-settler. The determination of the number of extraction stages and the number of strip stages desirable with any given extractant is a well established procedure. The process of the present invention is found to achieve good recovery of metals such as uranium with the use of fewer extraction and/or strip stages than are required for conventional processes.

The water-immiscible organic solvent conventionally used for solvent extraction is kerosene, but other solvents such as aliphatic hydrocarbons and chlorinated hydrocarbons may be used if desired.

Modifiers may be added to the extractant if desired to minimise any formation of a third phase which would interfere with the separation (phase disengagement) steps (3) and (4). Examples of such modifiers include alcohols, for example isodecanol or tridecanol, and alkyl phenols such as nonyl phenol. Modifiers such as these may also have the desirable effect of increasing the solubility of the extractant and the metal complex with the extractant in the organic solvent, or of reducing the solubility of the extractant in the aqueous phase.

The process of the present invention is especially suitable for the recovery of metals leached from their ores in the form of soluble oxyions. However, the process may be applied to aqueous solutions of metal oxyions from any source, including for example waste solutions from chemical processes or solutions derived from waste metals.

Taking uranium as an example, uranium is usually leached from its ores by sulphuric acid. Whilst the scope of the present invention is not to be taken as being limited by any particular theory, it is believed that uranium is extracted essentially as the uranyl ion ($UO_2^{2+}$) which is present in solution in the form of various complexes with sulphate ion such as $[UO_2(SO_4)_3]^{4-}$. It is also believed that the organic phase imidazole or benzimidazole (AN) is at least partly protonated by the aqueous phase acid:

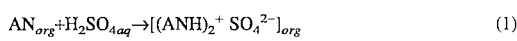  (1)

The extraction of the uranium aqueous phase species into the organic phase is then thought to take place by an ion exchange reaction such as:

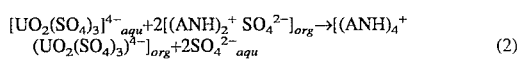 (2)

It will be seen that the complex of the metal species with the imidazole or benzimidazole extractant takes the form of an ion pair of salt of the protonated form of the extractant.

If there is insufficient acid present in the aqueous metal solution to be treated, the protonation reaction (1) above does not proceed satisfactorily. Conversely, if there is excessive acid present, a bisulphate salt may be formed. It is preferred therefore that the process of the present invention be applied to solutions of metal oxyions having an acid concentration in the range 1 to 30 grams per liter sulphuric acid. With uranium, for example, conventional leaching processes for the treatment of the ore produce solutions having an acid concentration typically in the range 3 to 20 grams per liter sulphuric acid.

The process of the present invention may be applied to metals which form an oxyion species in solution. Examples of such metals are tungsten (forming a metal tungstate), molybdenum (forming a molybdate), chromium (forming a chromate) and vanadium (forming the vanadyl ion or a vanadate). Some metals may form an oxyion species in one oxidation state and a simple salt in another oxidation state; the process of the present invention applies only to these metals when in the form of an aqueous oxyion species.

EXAMPLE 1

1-isodecylbenzimidazole was prepared by the following method:

Benzimidazole (101.5 parts), potassium hydroxide pellets (48.6 parts) and ethyl alcohol (740 parts) were placed in a reaction flask fitted with stirrer, dropping funnel and reflux condenser. To the stirred mixture was added slowly 230 parts of isodecyl bromide and the reactants heated at reflux for 2 hours. The flask was then allowed to cool, the condenser set for distillation and the alcohol distilled off. To the flask was added 500 parts toluene, 400 parts of 5% aqueous sodium chloride solution, the contents stirred for 5 minutes and transferred to a separating funnel. The aqueous phase was run off and discarded and the organic phase washed with successive portions of 5% sodium chloride solution until neutral. This was followed by two washes with 2 molar hydrochloric acid containing 5% sodium chloride followed by further washed with 5% sodium chloride solution until washes were neutral.

The toluene was stripped off the organic product and the residue distilled under reduced pressure to give 182.2 parts of product boiling range 146°–162° C./0.06 mm Hg 82% yield based on benzimidazole.

The ability of the 1-isodecylbenzimidazole to extract uranium was evaluated as follows:

A solution was prepared containing 32.25 g/l (0.125 molar) of the product prepared above together with 20 g/l p-nonyl phenol in Escaid 100 (a kerosene type hydrocarbon solvent developed as a carrier in solvent extraction processes). Portions of this solution were contacted by vigorous stirring for 15 minutes with equal volume portions of 1.00 g/l uranium as uranyl sulphate in aqueous solution at various initial pH values, the required initial pH being obtained by the addition of sulphuric acid.

The organic and aqueous phases were separated and the organic phase analysed for uranium. The results are given in Table 1.

TABLE 1

| pH (initial) | 2.5 | 2.25 | 2.0 | 1.75 | 1.50 | 1.25 | 1.0 |
|---|---|---|---|---|---|---|---|
| mg/l uranium in organic phase | 58.9 | 218 | 397 | 818 | 1069 | 1388 | 1175 |

EXAMPLE 2

1-(2-hexyl decyl)benzimidazole was prepared by the following method:

Potassium hydroxide pellets (91.1 parts) were dissolved in methylated spirits 74° OP (820 parts) in a flask fitted with stirrer, thermometer, reflux condenser and dropping funnel. Benzimidazole (191.9 parts) was then added and stirring maintained at 30° C. until it was dissolved. 1-(2-hexyl decyl) bromide was added from the dropping funnel with stirring over 15 minutes, the mixture heated to reflux for 6 hours and allowed to cool overnight. The 1-(2-hexyl decyl)bromide was prepared from 2-hexyldecyl decanol supplied by the Enjay Chemical Company and described by them as being "a branched chain $C_{16}$ primary alcohol derived from petroleum. The primary carbinol group is located approximately in the middle of a long branched chain. It is made up of an array of isomeric structures". The condenser was then set for distillation, the alcohol distilled off and the flask allowed to cool. To the crude products in the flask were added 1000 parts of cold water and 800 parts of light petroleum (40°–60°) stirring maintained for 15 minutes to dissolve the precipitated potassium chloride and the organic and aqueous phases separated.

The organic phase was washed with several portions of M/1 hydrochloric acid in 10% sodium chloride solution followed by 10% sodium chloride solution then M/1 sodium hydroxide in 110% sodium chloride solution, followed by several washed with 10% sodium chloride solution.

The organic phase was separated off, dried over anhydrous magnesium sulphate, filtered, and the solvent distilled off to give 546.8 parts of crude product. This was distilled under reduced pressure to give 393.5 parts of a fraction boiling at 175°–184° C./0.1 mm.

The 1-(2-hexyl decyl)benzimidazole was evaluated as an extractant for uranium by the following method.

A solution was prepared containing 42.75 g/l (0.125M) of the 1-(2-hexyldecyl)benzimidazole prepared as described above in Escaid 100. Portions of this solution were equilibrated by stirring for 15 minutes with equal volume portions of solutions containing 0.972 g/l uranium as uranyl sulphate plus various amounts of sulphuric acid to give a range of initial pH values. The phases were then separated and the aqueous solutions analysed for uranium. The amount of uranium remaining in aqueous solution after one contact with the extractant solution at various initial pHs is shown in Table 2.

TABLE 2

| pH (initial) | 2.70 | 2.42 | 2.13 | 1.84 | 1.58 | 1.32 | 1.04 | 0.92 |
|---|---|---|---|---|---|---|---|---|
| mg/l uranium remaining in aqueous phase | 964 | 960 | 940 | 920 | 505 | 168 | * | * |

*Down to initial pH 1.32 separations were clean and rapid. Solutions at initial pH 1.04 and 0.92 showed third phase formation which interferred with phase separation, and these solutions were not analysed.

EXAMPLE 3

The procedure of Example 2 was repeated but with the inclusion of 20 g/l of 4-nonyl phenol in the Escaid solution of 1-(2-hexyldecyl)benzimidazole. Again, portions of the extractant solution were contacted with solutions containing 0.972 g/l uranium plus various amounts of sulphuric acid, the phases separated and the aqueous solutions analysed for uranium content. The results are shown in Table 3.

TABLE 3

| pH (initial) | 2.70 | 2.40 | 2.13 | 1.84 | 1.58 | 1.32 | 1.04 | 0.92 |
|---|---|---|---|---|---|---|---|---|
| mg/l uranium remaining in aqueous phase | 960 | 953 | 935 | 863 | 388 | 4 | 2 | Some detected |

No third phase formation was observed. It will be noted that the presence of the 4-nonylphenol in the organic phase results in higher uranium extraction (lower residual uranium in the aqueous phase) as compared with Example 2 in which 4-nonylphenol was not added.

EXAMPLE 4

Mixed 5/6-methyl-1-(2-hexyldecyl)benzimidazole was prepared from a mixture of 5- and 6-methylbenzimidazole by reaction with 1-(2-hexyldecyl)bromide by the method described in Example 2. The 1-(2-hexyldecyl)bromide was prepared from 1-(2-hexyl)decanol supplied by Efkay Chemicals, and the $C_6$ and $C_8$ groups were both stated to be essentially straight chain groups in the structure:

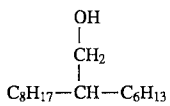

A 0.125 molar solution was made up (46.7 g/l) incorporating in addition 20 g/l 4-nonyl phenol in Escaid 100. Portions of this solution were contacted with equal volume portions of a uranium solution containing 0.972 g/l uranium as uranyl sulphate and various amounts of sulphuric acid. After equilibrating, samples of the aqueous solution were removed, analysed for uranium, and the amount of uranium extracted calculated by difference. The results are shown in Table 4.

TABLE 4

| pH (initial) | 1.32 | 1.58 | 1.84 |
|---|---|---|---|
| mg/l uranium in organic phase | 968 | 852 | 92 |

EXAMPLE 5

1-(2'-hexyldecyl)-2-ethyl-4,5,6-7-tetrahydro benzimidazole (V) was prepared as follows:

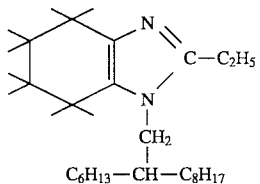

(V)

A mixture of 2-ethylbenzimidazole (20 parts), glacial acetic acid (100 parts) and 3% palladium on carbon catalyst (3 parts) is hydrogenated, in a glass liner within a rocking steel autoclave, at 50 Atmospheres pressure for 5 hours at a temperature of 180° C. The mixture is cooled and filtered and then diluted with water (400 parts) and made alkaline with sodium hydroxide, when 2-ethyl-4,5,6,7-tetrahydrobenzimidazole is precipitated. After collecting the precipitate, washing it with aqueous ammonia (density 0.88), and drying under reduced pressure, 15.3 parts, mp 294°–205° C., are obtained.

2-Ethyl-4,5,6,7-tetrahydrobenzimidazole (14.3 parts), 2-methoxyethanol (30 parts), 1-bromo-2-hexyldecane (35 parts) and sodium carbonate (5.7 parts) are stirred together and heated at 125°–135° C. below a reflux condenser for 15 hours. The reaction mixture is cooled and extracted with a mixture of toluene (150 parts) and ethyl acetate (50 parts) and the extract is washed successively with water, dilute sulphuric acid, dilute sodium hydroxide, and water, and then distilled yielding 1-(2'-hexyldecyl)-2-ethyl-4,5,6,7-tetrahydrobenzimidazole (V) (16.6 parts), b.p. 185°–200° at 0.2 mm pressure.

A solution was prepared containing 48.6 g/l (V) (0.125 molar) plus 20 g/l 4 nonyl phenol in Escaid 100. Portions were contacted with equal volume portions of a uranium solution containing 0.972 g/l uranium as uranyl sulphate and various amounts of sulphuric acid. After equilibrating, samples of the aqueous phase were removed, analysed for uranium, and the amount of uranium extracted calculated by difference as before. The results are shown in Table 5.

TABLE 5

| Initial pH | 1.32 | 1.84 | 2.42 |
|---|---|---|---|
| mg/l uranium in organic phase | 969 | 887 | 372 |

EXAMPLE 6

1-(2'-hexyldecyl)-4,5,6,7-tetrahydrobenzimidazole (VI) was prepared as follows:

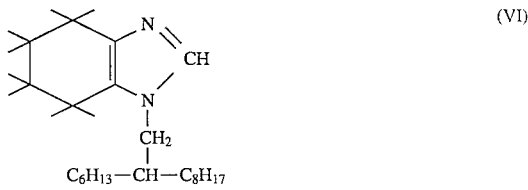

(VI)

Hydrogenation of 1-(2'-hexyldecyl)benzimidazole (26.1 parts) is carried out as described in Example 5 except that a temperature of 200° C. and a reaction time of 8 hours are allowed. The product is a liquid yielding 21 parts of 1-(2'-hexyldecyl)-4,5,6,7-tetrahydrobenzimidazole, b.p. 180°–120° C. (0.1 mm) on distillation.

An extractant solution was prepared containing 43.7 g/l of (VI) (0.125 molar) and 20 g/l 4-nonyl phenol. On contact with 0.972 g/l uranium at various pHs as before, the results shown in Table 6 were obtained.

TABLE 6

| Initial pH | 1.32 | 1.58 | 1.84 | 2.13 | 2.42 | 2.70 |
|---|---|---|---|---|---|---|
| mg/l uranium in organic phase | 969 | 966 | 932 | 544 | 312 | 262 |

EXAMPLE 7

A mixture of 1-decyl 2 alkylbenzimidazoles (VII)

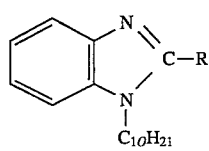

(VII)

where R is a mixture of $C_7$, $C_8$ and $C_9$ alkyl groups was prepared as follows:

A commercial mixture of straight and branched chain octanoic, nonanoic and decanoic acids ("Novadel 810") is heated at 200° with o-phenylene diamine to give a mixture of 2-alkylbenzimidazoles melting at 145°–149° C. This mixture (48 parts) is stirred and boiled under reflux with ethanol (80 parts), potassium hydroxide (14 parts), and isodecyl bromide (46.5 parts, which is prepared from commercial isodecanol, itself a mixture of branched primary decanols obtained via trimerisation of propane). After 8 hours the mixture is cooled, adjusted to pH 8 with concentrated hydrochloric acid, treated with charcoal, filtered, and their distilled under reduced pressure. The product (40.8 parts) is the fraction distilling at 200°–209° C. at 0.08 mm pressure. By titration of a sample with perchloric acid in acetic acid it is found to have an average molecular weight of 346.

As in previous examples, 0.125 molar solutions (43.3 g/l) of VII was prepared plus 20 g/l 4-nonyl phenol in Escaid 100. Contacted with 0.972 g/l uranium at various pHs as before. The results are shown in Table 7.

TABLE 7

| Initial pH | 1.32 | 1.58 | 1.84 |
|---|---|---|---|
| mg/l uranium extracted | 687 | 622 | 62 |

EXAMPLE 8

A solution was prepared containing 42.75 g/l (0.125 molar) of 1-(2-hexyldecyl)benzimidazole, and 20 g/l of 4-nonyl phenol in Escaid 100 kerosene type solvent. The preparation of the 1-(2-hexyldecyl)benzimidazole was as described in Example 2, except that the 2-hexyl decanol starting material, supplied by Efkay Chemical Co., contained essentially straight chain $C_6$ and $C_8$ groups in the structure:

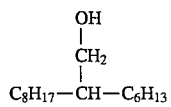

Portions of this solution were equilibrated by vigorous stirring for at least 15 minutes at various volume ratios with portions of an aqueous solution containing 0.915 g/l uranium as uranyl sulphate plus 10 g/l sulphuric acid. The phases were then separated, the amount of uranium remaining in the aqueous solutions analysed and the amount extracted in to the organic phase calculated by difference. The distribution of uranium at various volume ratios is shown in Table 8.

TABLE 8

| Ratio aqueous volume to organic phase volume | 1/1 | 1.5/1 | 3/1 | 4/1 | 5.7/1 | 8/1 | 9/1 | 18/1 |
|---|---|---|---|---|---|---|---|---|
| mg/l uranium in organic phase | 913 | 1365 | 2636 | 3355 | 3827 | 4100 | 4230 | 4680 |
| mg/l uranium in aqueous phase | 2 | 5 | 36 | 76 | 240 | 365 | 445 | 655 |

At not stage was any precipitate of 1-(2-hexyl decyl) benzimidazole or of its complex with uranium observed.

To illustrate the ease of recovery of uranium from the loaded extractant solution (i.e. stripping), the extractant solution described above was loaded with 5.04 g/l uranium by contact with an acidic uranyl sulphate solution. Portions of this solution were contacted at various volume ratios with portions of an aqueous solution containing 132 g/l ammonium sulphate (1.0 molar). After vigorous stirring for at least 15 minutes to establish equilibrium the organic and aqueous phases were separated and each analysed for uranium. The results are shown in Table 9.

TABLE 9

| Ratio aqueous volume to organic volume | 3:1 | 1:1 | 1:2 | 1:2.8 | 1:3.6 |
|---|---|---|---|---|---|
| mg/l uranium in organic phase | 2 | 232 | 1038 | 1900 | 2200 |
| mg/l uranium in aqueous phase | 1650 | 4800 | 8000 | 9800 | 10,200 |

Figure 2:
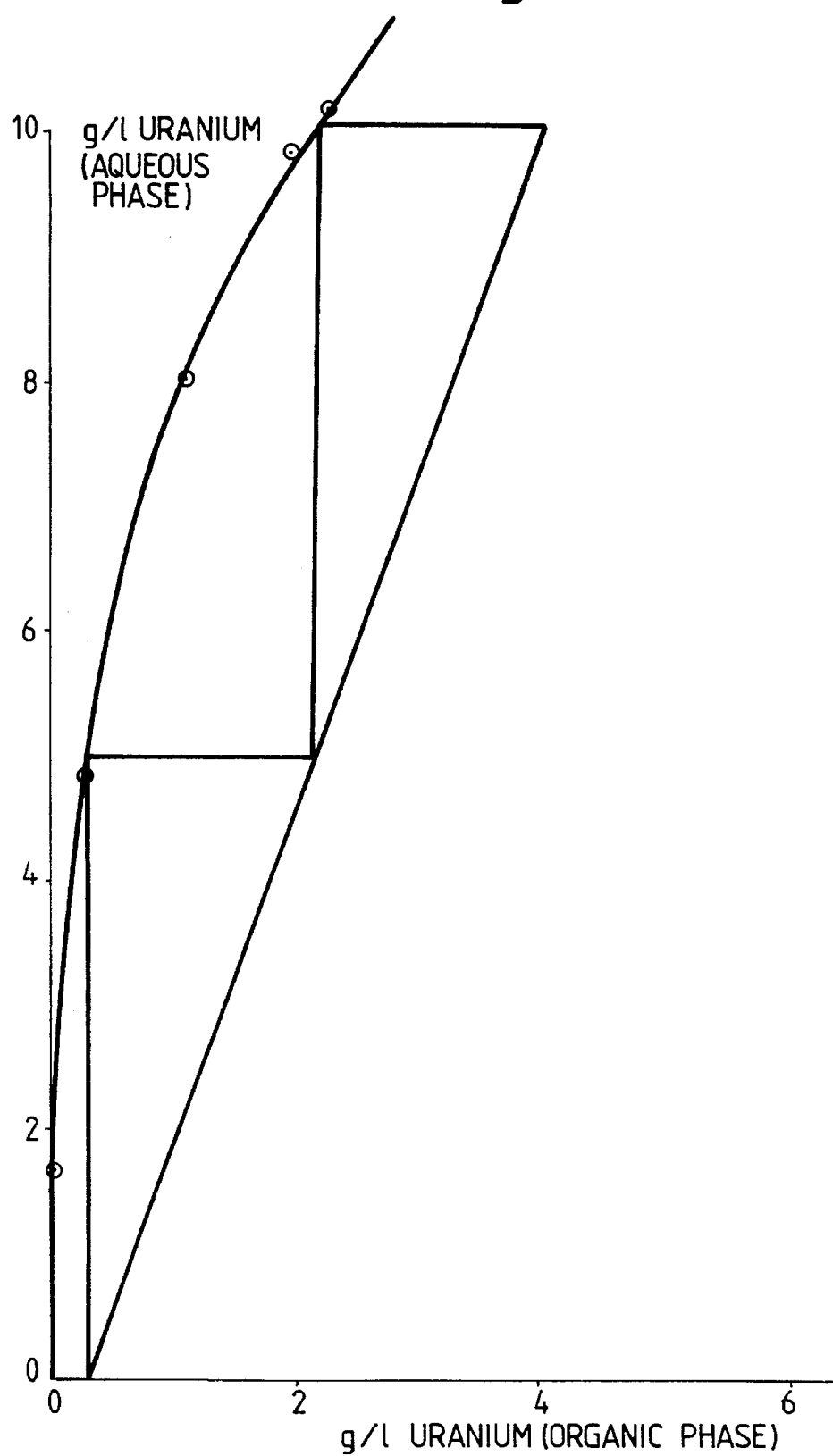
FIG. 2 is a strip isotherm for uranyl ions using 1-(2-hexyldecyl) benzimidazole as the imidazole compound.

The data of Table 8 are plotted in FIG. 1 as an extraction isotherm and the data of Table 9 are plotted in FIG. 2 as a strip isotherm. Shown in FIGS. 1 and 2 are McCabe Thiele constructions which are used to predict the number of separate stages required in extraction and strip respectively to achieve a satisfactory recovery for uranium (see for example G. M. Ritcey and A. W. Ashbrook in Handbook of Separation Techniques for Chemical Engineers; P. A. Schweitzer McGraw Hill, 1979, page 114) for a description of the utilisation of the McCabe-Thiele construction to predict the number of extraction and strip stages required). The constructions in FIGS. 1 and 2 indicate that for the feed shown (0.915 g/l uranium, 10 g/l $H_2SO_4$) treated with an organic solution containing 0.125 Molar 1-(2-hexyldecyl) benzimidazole in Escaid 100 containing 2% w/v of nonyl phenol, two extraction stages and two strip stages will give a raffinate containing less than 0.01 g/l of uranium representing a recovery of better than 99%.

EXAMPLE 9

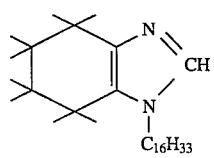

A 0.125 molar (43.33 g/l) solution of the product of Example 6 was prepared incorporating 20 g/l 4-nonylphenol in Escaid 100. Various volume ratios of this solution and an aqueous solution containing 0.89 g/l uranium as uranyl sulphate plus 10 g/l sulphuric acid were equilibrated, separated and the amount of uranium extracted determined in Example 8. The results are shown in Table 10.

TABLE 10

| Ratio volume of aqueous to volume of organic | 3/1 | 4/1 | 5.7/1 | 8/1 | 9/1 |
|---|---|---|---|---|---|
| mg/l uranium in organic phase | 2268 | 3540 | 4600 | 4960 | 4990 |
| mg/l uranium in aqueous phase | 4 | 5 | 78.5 | 270 | 335 |

I claim:

1. A process for the extraction of a metal selected from the group consisting of tungsten, molybdenum, chromium and vanadium metal values from an aqueous solution containing an oxyanion of at lest one of said metals, the absence of halogen or pseudohalogen anions, and an acid concentration of 1 to 30 grams per liter sulphuric acid, which comprises contacting the aqueous solution with a solution in a water-miscible organic solvent of an imidazole selected from the group consisting of 1-isodecylbenzimidazole, 1-(2-hexyldecyl)benzimidazole, 5-methyl-1-(2-hexyldecyl)benzimidazole, 6-methyl-1-(2-hexyldecyl)benzimidazole, 1-decyl-2-alkylbenzimidazole where the 2-alkyl is a mixture of $C_7$, $C_8$ and $C_9$ alkyl groups, 1-(2'-hexyldecyl)2-ethyl-4,5,6,7-tetrahydrobenzimidazole and 1-(2'-hexyldecyl)4,5,6,7-tetrahydrobenzimidazole so as to provide an aqueous phase and an organic phase and separating the aqueous phase from the organic phase which contains in solution a complex of the metal oxyanion and the imidazole.

2. A process as claimed in claim 1 wherein said organic phase containing a complex of the metal oxyanion and the imidazole, after separation from the aqueous phase, is contacted with an aqueous solution of a stripping agent and the organic phase is then separated from the resulting aqueous phase containing the metal as a complex with the stripping agent.

3. A process as claimed in claim 2 wherein the stripping agent is ammonium sulphate, sodium chloride or sodium carbonate.

4. A process as claimed in claim 1 wherein the organic solution also contains a modifier which is an alcohol or an alkyl phenol.

5. A process according to claim 1 wherein molybdenum is extracted and the imidazole is 1-(2-hexyldecyl)benzimidazole.

* * * * *